Sept. 15, 1931.  H. H. BOYCE  1,823,344
MOTOR HEAT INDICATOR
Filed May 25, 1927  2 Sheets-Sheet 1
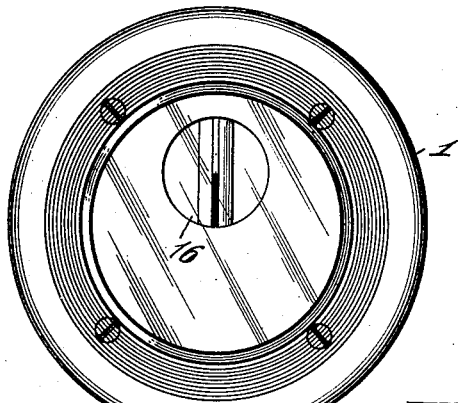
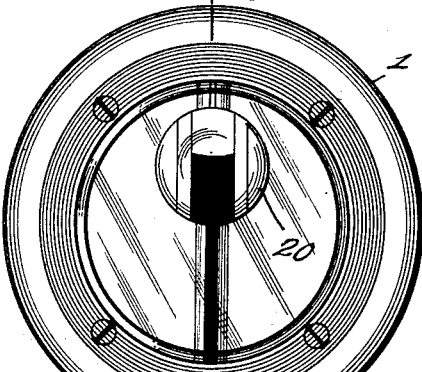
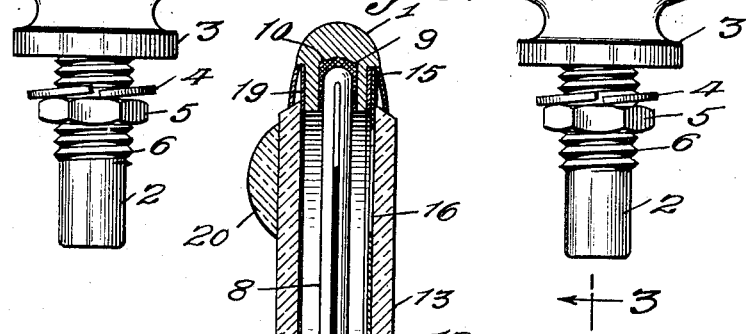
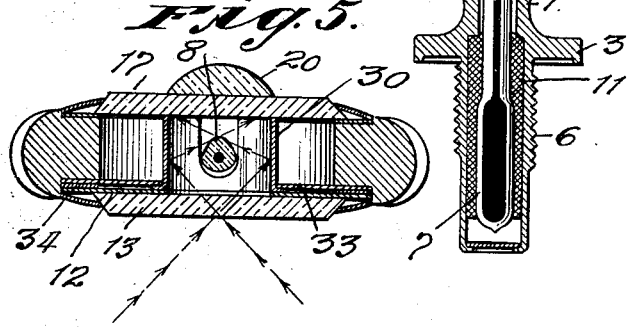
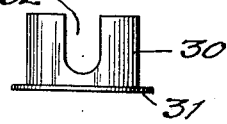
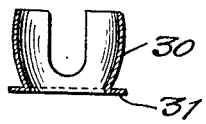
INVENTOR
HARRISON H. BOYCE
BY
ATTORNEY Sept. 15, 1931.  H. H. BOYCE  1,823,344
MOTOR HEAT INDICATOR
Filed May 25, 1927  2 Sheets-Sheet 2
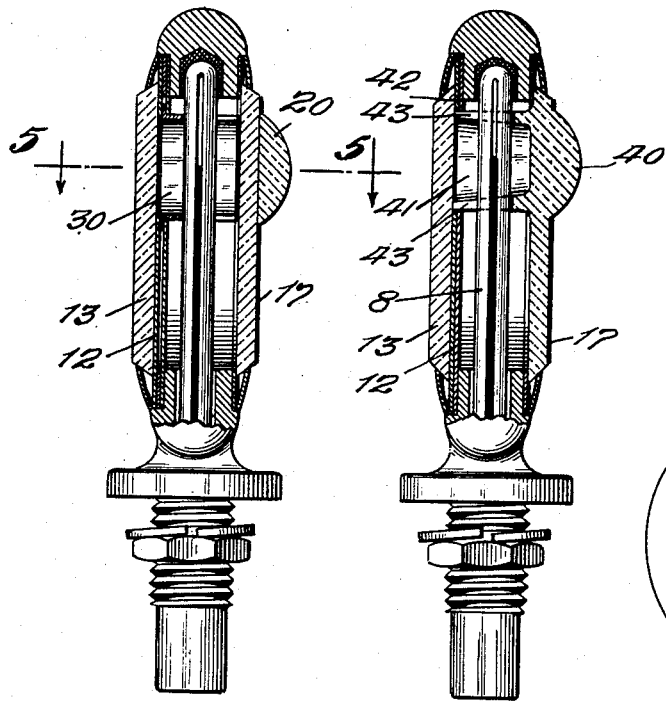
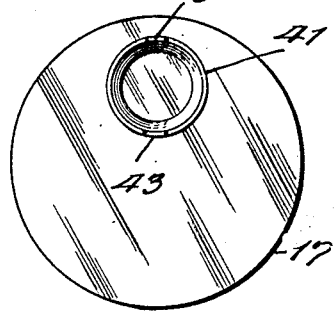
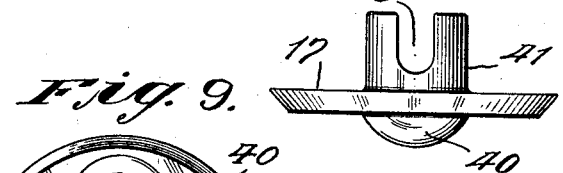
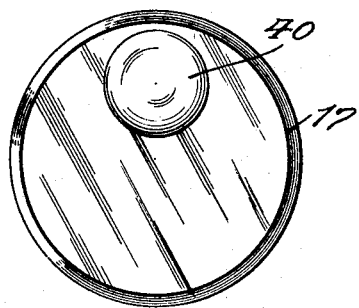
INVENTOR
HARRISON H. BOYCE
BY
ATTORNEY Patented Sept. 15, 1931

1,823,344

UNITED STATES PATENT OFFICE

HARRISON HURLBERT BOYCE, OF JERICHO, NEW YORK

MOTOR HEAT INDICATOR

Application filed May 25, 1927. Serial No. 194,009.

This invention relates to devices for indicating the heat condition within the cooling systems of internal combustion engines and especially internal combustion engines of the automotive type.

One of the objects of this invention is to provide means for indicating the condition of the cooling system of an internal combustion engine, throughout the normal range prevailing therein and to accentuate a portion of said indication corresponding to the danger zone by day or night.

Another object of this invention is to provide in a device for indicating the heat condition within an automotive radiator, a chamber extending from the front to the back thereof and enclosing the portion of the scale of an indicating device for indicating the heat condition within said radiator corresponding to a dangerous heat condition within the radiator.

Another object of this invention is to provide means for gathering and deflecting light rays in the neighborhood of the indication corresponding to a dangerous heat condition within the cooling system of an automotive radiator.

Another object of this invention is to provide means for accentuating the deflected light rays adjacent the indication of a dangerous condition within the cooling system and at the same time accentuating the indication in the danger range by day and night by a change in color of the light rays.

Another object of this invention is to provide the aforementioned chamber with reflecting surfaces on its inner side.

Other objects and advantages will become apparent from the following specification, claims and appended drawings in which:—

Fig. 1 is a front elevation view of one embodiment of my device.

Fig. 2 is a rear elevation view of the embodiment of my device shown in Fig. 1.

Fig. 3 is a cross-sectional view on the line 3—3 of Fig. 1.

Fig. 4 is a view partly in section showing a modified form of construction.

Fig. 5 is a cross-sectional view on the line 5—5 of Fig. 4.

Fig. 6 is a detail view of the light confining and reflecting cylinder shown in Figs. 4 and 5.

Fig. 7 discloses a modified form of the light confining and reflecting cylinder shown in Figs. 4 and 5.

Fig. 8 is a view partly in section of another modified embodiment of my device.

Figs. 9, 10 and 11 are detail views showing the construction of the front bezel of the modification shown in Fig. 8.

My device as shown in the drawings and especially Figs. 1, 2 and 3 thereof comprises a casing 1 of usual construction and provided with a downwardly extending hollow stem 2 formed integral therewith. At the upper end of the stem 2 an outwardly extending base flange 3 is formed integral with the stem 2 and casing 1. The stem 2 is adapted to pass through the radiator cap or closure device (not shown in the drawings) and to be secured thereto with the base flange 3 against the outer surface thereof by a lock washer 4 and nut 5 cooperating with a threaded portion 6 of the stem 2. The stem thus extends into the usual air space at the top of the radiator.

Located within the hollow stem 2 is a heat responsive device 7 provided with an indicating stem 8 extending across the casing member 1 and entering a recess 9 in the top side thereof. The stem 8 is secured in place in the recess 9 by heat insulating material 10 and the heat responsive device 7 is secured within the hollow stem 2 by similar material 11. The rear face of the casing 1 is closed by a dial 12 and a bezel 13 secured in place by a retaining ring 14. A gasket 15 is placed between the dial 12 and the casing 1, as shown in Fig. 3. The dial 12 is provided with an aperture 16 adjacent the upper end of the reading range of the indicating stem 8 of the heat responsive device 7. This aperture lies to the rear of the portion of the indicating stem 8 corresponding to the indicating of a dangerous heat condition within the automotive radiator to which my device is attached. The indicating fluid moves rapidly into this portion corresponding to the dangerous heat condition when the abnormal condition causes steam in the air space because of the sudden jump in temperature from water vapor to steam in the air space. This movement is thus noticeable, to a high degree when danger conditions exist.

The front side of the casing 1 is closed by a bezel 17 retained in place by a ring 18. A gasket 19 is provided between the bezel 17 and the casing 1. Mounted on the bezel 17 is a lens or magnifying device 20, which may be suitably secured thereto by the use of transparent cement, by fusing, or may be formed integral with the bezel 17. This magnifying device is adjacent part of that indicating stem 8 which corresponds to a dangerous condition within the automotive radiator to which my device is attached and is also in line with the aperture 16 in the rear dial 12. The lens 20 therefore also accentuates the reading of the indicating element 8 in the region of dangerous indication. And any dangerous condition is at once apparent due to the sudden rise and apparent magnification of the indicating medium.

A new and novel result is obtained by mounting the lens 20 in close proximity to the indicating stem 8 and in front of the aperture 16 of the rear dial 12. In addition to giving a sudden magnification of the indicating fluid in the stem 8 as it enters the danger zone, in night or day driving when the heat condition within the radiator to which my device is attached is such that the indicating fluid within the stem 8 is below the aperture 16 the light rays entering said aperture will pass to the lens 20 and be dispersed as substantially white or yellow light, throwing off a series of sparkling beams. When the indicating fluid which in normal practice is colored extends within the aperture 16 the light dispersed through the lens 20 will be colored the same as the indicating fluid. Thus if the indicating fluid be red, the lens 20 will appear as a red light at night, giving off sparkling red beams whenever said indicating fluid extends within the aperture 16.

In Figs. 4 and 5, I have shown a modified form of my device in which I have added a light reflecting and confining chamber or cylinder between the aperture 16 in the rear dial and the lens 20 of the front dial. In these figures, I have designated the parts which are common to my first embodiment by similar numbers and have designated the light confining chamber by the numeral 30. This cylinder as shown in Fig. 6 is provided with a flange 31 and also diametrically opposed notches 32 through which the indicating stem 8 is adapted to pass. The member 30 is of a sufficient length to extend from the rear dial 12 to the front bezel 17 and is secured in alinement with the aperture 16 in the rear dial and the lens 20 in the front dial in the following manner: An additional rear dial 33 is provided and an aperture is formed in this dial of sufficient size to receive the member 30 with its flange 31 resting against the outer side of the dial. The aperture in the dial 33 is so positioned as to bring the member 30 in alinement with the aperture 16 in the dial 12 when assembled within the casing 1. The dial 12 rests against the outer side of the flange 31 of the member 30 when assembled thus securely holding said member in position. A separating gasket 34 is provided between the dials 12 and 33.

As is clearly shown in Figs. 4 and 5, the light confining member 30 when assembled extends from the rear dial 12 to the bezel 17 and embraces that portion of the indicating stem 8 which corresponds to the indication of a dangerous condition within the cooling system to which my device is applied. Thus light rays entering the chamber 30 directly from the rear will be carried to the lens 20 and dispersed thereby. Light rays entering the reflecting and confining chamber 30 at an angle will be reflected by the inner surface thereof and dispersed angularly by the lens 20. The path of rays entering the member 30 diagonally is clearly shown in Fig. 5.

The inner surface of the member 30 may be polished, silvered or rendered reflecting in any other suitable manner for facilitating and increasing its power of reflection. The inner surface of the member 30 may be cylindrical as shown in Fig. 6, barrel shape, as shown in Fig. 7 or formed in any other desired shape as with facets. The diagonal light rays which enter the reflecting and confining chamber 30 are dispersed by the lens 20 at various angles to each other and appear at night more or less as a cluster of small search lights when the source of light is constant and the vehicle upon which my device is mounted is at rest. If the source of light is not constant or the vehicle is in motion, the reflected and dispersed rays will constantly change in intensity and direction and scintillate.

In night driving the light dispersed through the lens 20 will be white or yellowish at all times when the indicating fluid within the indicating stem 8 is below the aperture 16 and the rear dial 12. When the indicating fluid within the stem 8 extends in front of the aperture 16 the light emanating from the lens 20 will be of the same color as the indicating fluid.

In the embodiment of my invention shown in Figs. 8, 9, 10, and 11, I have formed the magnifying projection and the light confining chamber integral with the front bezel 17. I have designated the magnifying projection by the numeral 40 and the light confining chamber by the numeral 41. The light confining chamber 41 is substantially cylindrical on its outer surface and extends through the rear dial 12 to a point adjacent the rear bezel 13. In order to securely hold the light confining chamber 41 in place, I have provided an additional rear dial 42 which lies adjacent the rear dial 12 and is provided with an aperture embracing the light confining member 41. This additional dial merely gives greater thickness to the customary rear dial 12.

The inner surface of the light confining chamber 41 is tapered toward the inner end thereof, as shown in Fig. 8. The inner or outer surface or both may be faceted or otherwise irregularly formed to reflect light rays at various angles. The outer surface of this light confining member may be, if desired coated with a light reflecting substance to increase the reflection of light rays within the chamber. This light confining chamber is provided with notches 43 to permit the indicating stem 8 to pass therethru.

The operation of this embodiment of my device is similar to previously described embodiments and therefore needs no further description. It is apparent, however, that this embodiment is extremely cheap of manufacture and rugged in construction owing to the integral nature of the magnifying projection 40, light confining chamber 41, and bezel 17.

It will be appreciated that when the indicating fluid enters the zone magnified by the lenses 20 or 40, the reading of the fluid column is not only magnified in width, as illustrated in Fig. 1, but is also magnified in length. For each fraction of an inch of rise of the fluid column within the danger zone, there is an apparent rise of two or three times the actual rise indicated by the lenses 20 or 40 which gives the effect of a sudden jump of the indication within the danger zone, the suddenness of which will arrest the driver's attention and cause him to investigate the cause thereof.

It will be understood that the construction which has been described with reference to radiator heat indicators may be readily applied to dash-board indicators as well and that various other changes in the construction of the embodiment illustrated in the drawings may be made without departing from the spirit of the invention, and I do not therefore desire to limit myself to the specific construction shown and described but to interpret the invention broadly within the scope of the appended claims.

What I claim as my invention is:

1. In a device for indicating the heat condition within an automotive radiator, a heat responsive device having an indicating element, a chamber having reflecting surfaces embracing the portion of said indicating element corresponding to a dangerous heat condition within said radiator, said chamber being adapted to collect and concentrate light rays upon the indicating element, means at one end of chamber for dispersing the light rays passing thru said chamber and accentuating the reading of the indicating element in the region corresponding to said dangerous indication.

2. In a device for indicating the heat condition within an automotive radiator, a housing, an indicating element therein of a device responsive to changes in heat condition within said radiator, a plate bezel for said housing having a magnifying portion adjacent a portion of said indicating element and a light confining and reflecting chamber extending rearwardly from said bezel and embracing the portion of said indicating element accentuated by said magnifying portions.

3. In a device for indicating the heat condition within an automotive radiator, a housing, an indicating element therein of a device responsive to changes in heat condition within said radiator, a rear dial for said housing formed with an aperture to the rear of and in line with the indication of said indicating element corresponding to a dangerous heat condition within said radiator, a front bezel for said housing, a light confining and reflecting member extending from said aperture to said bezel and embracing the portion of said indicating element corresponding to the indication of a dangerous heat condition within said radiator, and means on said bezel for dispersing the light rays passing thru said light confining and reflecting member.

In testimony whereof I have affixed my signature to this specification.

HARRISON H. BOYCE.